(12) United States Patent
Börnchen et al.

(10) Patent No.: US 7,276,009 B2
(45) Date of Patent: Oct. 2, 2007

(54) SERVO DRIVE

(75) Inventors: Thomas Börnchen, Bamberg (DE);
Michael Eisentraudt, Stockheim-Neukenroth (DE); Uwe Klippert, Oberaula (DE); Thomas Salhoff, Hallstadt (DE); Helmut Sesselmann, Hallstadt (DE); Uwe Sommer, Effelder (DE); Werner Stammberger, Weissenbrunn am Forst (DE); Manfred Stenzel, Bamberg (DE); Joachim Müller, Schonungen (DE)

(73) Assignee: Brose Fahrzeugteile GmbH & Co Kg, Coburg, Coburg (DE)

( * ) Notice: Subject to any disclaimer, the term of this patent is extended or adjusted under 35 U.S.C. 154(b) by 147 days.

(21) Appl. No.: 10/523,464

(22) PCT Filed: Aug. 4, 2003

(86) PCT No.: PCT/DE03/02615

§ 371 (c)(1),
(2), (4) Date: Sep. 23, 2005

(87) PCT Pub. No.: WO2004/015306

PCT Pub. Date: Feb. 19, 2004

(65) Prior Publication Data

US 2006/0105877 A1 May 18, 2006

(30) Foreign Application Priority Data

Aug. 2, 2002 (DE) .............................. 102 36 372

(51) Int. Cl.
*F16H 48/06* (2006.01)
(52) U.S. Cl. ..................................... 475/149

(58) Field of Classification Search ................ 475/149; 296/146.2; 49/352; 254/344, 362
See application file for complete search history.

(56) References Cited

U.S. PATENT DOCUMENTS 3,930,566 A 1/1976 Matsushima
6,629,905 B1 10/2003 Sesselmann et al.

(Continued)

FOREIGN PATENT DOCUMENTS

DE 41 28 257 A1 3/1992

(Continued)

OTHER PUBLICATIONS

International Search Report of PCT/DE2003/002615, dated Feb. 2, 2004.

(Continued)

*Primary Examiner*—Dirk Wright
(74) *Attorney, Agent, or Firm*—Christie, Parker & Hale, LLP

(57) ABSTRACT

The invention relates to a servo drive comprising an electromechanical energy converter, which has a rotatably mounted disc rotor for generating a torque and a stepping up mechanism that is connected downstream of the disc rotor, for coupling the disc rotor to an output element and for stepping up the torque that acts on the disc rotor and comprising a locking mechanism that locks a rotational displacement of the output element, when a torque is introduced on the output side. According to the invention, the locking mechanism comprises a coil spring which can be radially expanded and compressed and which extends around the outer periphery of the stepping up mechanism.

37 Claims, 9 Drawing Sheets

U.S. PATENT DOCUMENTS 6,918,209 B2 * 7/2005 Regnier et al. ............... 49/352
2004/0100155 A1   5/2004 Sesselmann et al.

FOREIGN PATENT DOCUMENTS

| DE | 197 08 310 A1 | 9/1998 |
| DE | 199 44 915 A1 | 3/2001 |
| DE | 100 24 905 A1 | 11/2001 |
| DE | 100 24 908 A | 11/2001 |
| DE | 100 24 907 A1 | 12/2001 |
| EP | 0 012 250 A1 | 6/1980 |
| EP | 1 137 153 A2 | 9/2001 |

OTHER PUBLICATIONS

International Preliminary Examination Report of PCT/DE2003/002615, dated Sep. 27, 2004.

English translation of IPER for International Application No. PCT/DE2003/002615, international filing date of Aug. 4, 2003, in the name of Brose Fahrzeugteile GmbH & Co. KG, Coburg.

* cited by examiner

SERVO DRIVE

CROSS-REFERENCE TO RELATED APPLICATION

This application is a National Phase Patent Application of International Application Number PCT/DE2003/002615, filed on Aug. 4, 2003, which claims priority of German Patent Application Number 102 36 372.2, filed on Aug. 2, 2002.

BACKGROUND

The invention relates to servo drivers for motor vehicles.

Servo drivers for motor vehicles comprise an electromechanical (more particularly electromagneto-mechanical) energy converter having a rotatably mounted disc rotor for generating torque; a stepping up mechanism connected on the output side of the disc or rotor for coupling the disc rotor to an output element while simultaneously stepping up (more particularly in the form of a so-called reduction) of the torque acting on the disc rotor; as well as a locking mechanism which under the action of torque introduced on the output side into the servo drive locks a rotational movement of the output element and prevents the transfer of torque introduced on the output side over to the drive side, i.e., to the disc rotor.

The term "disc rotor" herein means a flat armature disc whose diameter is clearly greater than the height thereof (axial extension).

"Locking" a (rotational) movement of the output element means that when torque is introduced on the output side, only a slight restricted movement of the output element is to be possible to the extent required for activating the locking mechanism, but no substantial movement of the output element beyond that. In other words, any (rotational) movement of the output element is prevented insofar as it substantially exceeds a restricted movement required for actuating or shifting (activating) the locking mechanism; more particularly the locking mechanism is to prevent the output element from being able to rotate freely (around several revolutions) under the action of torque introduced on the output side, as is the case when torque is introduced on the drive side (through the disc rotor). The energy connected with the introduction of torque on the output side is thereby taken up, for example, by the locking mechanism.

The locking mechanism need not for this engage on the output element itself but can, for example, also act on a gear element of the stepping up mechanism. Decisive is only that torque introduced on the output side is blocked at some suitable point of the servo drive so that it cannot trigger any significant adjusting movement of the elements of the servo drive (more particularly not the output element).

The stepping up mechanism can, in the limiting case, also have a transmission ratio of 1:1 and then acts purely as a coupling mechanism for transferring torque between the disc rotor and the output element; in this case it can simply be formed by coupling elements mounted on the disc rotor (more particularly on its periphery) which act to transfer force or torque to the output element.

By introducing torque into the servo drive "on the output side" is meant introducing torque through an element which is mounted on the output side of the output element, thus which (seen from the drive side, i.e., from the disc rotor) lies in the force or torque flow behind the output element, such as e.g., a cable drum which as a constituent part of an adjusting mechanism of a window lifter is mounted behind the output element and is driven through same.

Servo drives are particularly suitable for adjusting adjustable parts in motor vehicles. For this the corresponding adjusting part of the motor vehicle is coupled to the output element of the servo drive. When using the servo drive in a vehicle window lifter for raising and lowering a window pane the output element of the servo drive can be connected, by way of example, to a cable drum about which is looped the drive cable which acts as the draw means for the vehicle window lifter. The servo drive then serves to generate a rotational movement of the cable drum connected to the output element and which in turn causes a movement of the drive cable which serves as the draw means through which the window pane is raised and lowered for adjustment.

By using a so-called disc rotor, i.e. an armature disc in the electromechanical energy converter, which on the basis of the electro-motorized principle provides the torque required for actuating the output element, a flat construction of the servo drive is sought corresponding to the small space which is normally available in motor vehicle doors for housing the servo drive. By means of the stepping up mechanism provided between the disc rotor and the output element, particularly when using the servo drive for adjusting adjustable parts in motor vehicles, a so-called reduction thereby takes place, i.e., the output element rotates at a lower speed than the disc rotor and consequently provides a greater torque for adjusting the corresponding adjustable part, such as e.g., a window pane.

With adjusting systems of this kind it is of great importance that torque introduced on the output side is not transferred to the drive side or leads to no substantial rotational movement on the output element. Thus, for example, it is to be prevented that a window pane of a motor vehicle can be lowered if a sufficiently large force is exerted on the window pane itself. If the transfer of such torque introduced on the output side to the drive side of the servo drive is not prevented, then the window pane could be lowered by forces applied to the window pane itself whereby the disc rotor would rotate along a direction which corresponds to a lowering of the window pane.

It is known to prevent such a return action of adjusting forces applied on the output side to the drive side through a self-locking design of the drive system. This has the drawback, however, that the efficiency of the servo drive is reduced.

A further possibility lies in using additional locking mechanisms which when introducing torque on the output side into the servo drive are activated and hereby act on an element of the servo drive so that the latter is locked and transfer of torque to the drive side is prevented. However the problem here is that the additional locking mechanisms take up additional space and therefore stand in the way of the smallest possible compact construction of the servo drive in the axial direction.

BRIEF SUMMARY

The invention is therefore concerned with the problem of providing a servo drive which is characterized by a compact structure, more particularly in the axial direction, with the greatest possible efficiency.

According to the invention, a coil spring whose windings extend around the outer periphery of the stepping up mechanism and/or the disc rotor of the servo drive serves as the locking mechanism for preventing the transfer of torque introduced on the output side to the drive side of the servo drive and thus acts to block rotational movement of the output element.

The solution according to the invention is based on the knowledge that in the case of a servo drive for motor vehicles, suitable locking mechanisms which lead neither to a significant reduction in the efficiency during normal adjusting operation nor result in any traceable enlargement of the axial extension of the servo drive, can be provided in that the locking mechanisms extends (solely) around the outer periphery of the stepping up mechanism or disc rotor of the servo drive, thus surround same, and at the same time have the smallest possible extension in the axial direction. This criterion is met by using a coil spring as a locking means which surrounds the stepping up mechanism of the servo drive in the manner of a ring.

With the servo drive according to the invention, depending on the design in each individual case, a number of other important advantages can be achieved apart from the flat method of construction and high efficiency. Thus, a coil spring can operate in a simple way to provide a locking action when torque is introduced on the output side and conversely when torque is introduced on the drive side, in order to generate a desired adjusting movement, in order to clear the locking action whereby at the same time a symmetrical construction of the adjusting gear is possible, for example with a view to using the same servo drive for both driver doors and passenger doors. Furthermore, a lock formed by a coil spring can be designed so that the output element has only a slight resetting behavior under the action of torque introduced on the output side. This is of great importance when using the servo drive in a motor vehicle window lifter in order to increase security against break-in. At the same time the load of the servo drive, particularly of the stepping up mechanism can be minimized in the currentless state owing to the inherent weight of the corresponding adjustable part (e.g. window pane) or as a result of elastic pretensioning of the adjustable part (e.g. as a result of a window pane seal acting on the upper edge of the window pane). Deformation and fatigue effects of plastics parts of the servo drive (particularly at high temperatures) are thereby prevented, for example.

Furthermore, by using the coil spring in the servo drive, in a simple way a damping mechanism can be integrated to cause a reduction in the shock loads when the corresponding adjustable part is moved into a block, e.g., a window pane which is to be adjusted by moving its upper edge into the upper window pane seal of a window or door frame.

The following peripheral conditions also apply for a locking mechanism or brake system when using a coil spring (so-called coil spring brake):

- A continuous or stepless engagement of the coil spring brake becomes possible, namely without using any additional electrically operated actuator, but mechanically controlled through the direction of the force flow; i.e., the brake is then to lock when the force flow or torque is introduced on the output side.
- The spring diameter, the spring wire cross-section as well as the wire geometry (round or polygonal) are adapted to the relevant conditions in the specific drive system.
- The stiffness of the spring ends must be sufficiently great in order to allow force to be introduced into the coil spring.
- The coil spring is as a rule pretensioned against a bearing face serving as the brake face and the surface area pressure, number of windings, friction value as well as lubrication are to be designed so that, on the one hand, through interaction of the coil spring with the associated brake surface (contact bearing surface) a reliable brake and locking action is achieved and, on the other hand, with an opened brake the efficiency of the servo drive is impaired as little as possible.

The servo drive is preferably designed so that at least one part of the gear elements of the stepping up mechanism, preferably the movable gear elements of the stepping up mechanism, are mounted overall coaxial with the disc rotor.

The coil spring embraces with its windings this stepping up mechanism and/or the disc rotor in that it is likewise arranged coaxial with the disc rotor and is dimensioned so that it surrounds the individual gear elements of the stepping up mechanism around the outer periphery of the stepping up mechanism. Namely, the gear elements of the stepping up mechanism, except only those parts which serve for actuating the coil spring and for transferring torque between the stepping up mechanism and output element with the introduction of torque on the drive and output sides, respectively, do not project radially (in relation to the rotational axis of the disc rotor) beyond the coil spring.

Radially outside of the field surrounded by the coil spring thus lie, in any case (exclusively), those movable elements of the servo drive which serve to actuate or shift (thus lock or unlock) the coil spring and to transfer torque between the stepping up mechanism and output element, as well as damping and spring elements which may interact herewith. Inside the region of the servo drive surrounded by the coil spring are thus located all the constituent parts of the stepping up mechanism which undertake the actual stepping up function.

As a result, the components of the servo drive serving for stepping up are arranged inside the field enclosed by the coil spring and the components of the servo drive serving to shift the coil spring are arranged on the outer periphery of the coil spring whereby, however, neither the one nor the other component projects axially substantially over the coil spring. Thus, the coil spring as well as the gear elements of the stepping up gear arranged in the space surrounded by the coil spring, on the one side, and the elements arranged on the outer periphery of the coil spring for actuating the coil spring and for transferring force, on the other side, form a stepping up mechanism for stepping up the torque generated by the disc rotor to an output element of the servo drive which is characterised by an extremely flat construction (slight axial extension).

In order to lock torque introduced on the output side, the coil spring can be pressed against a (preferably cylindrically formed) ring face so that a locking action is achieved through the force or friction engagement. The ring face can be formed in a simple way on the housing of the servo drive and can on one side form an inner ring face against which the coil spring is pressed with radially inwardly acting force, or an outer ring face against which the coil spring is pressed with radially outwardly acting forces. The coil spring is thereby secured axially on the corresponding housing part, e.g., by using corresponding projections or other contours on the housing part.

The coil spring can thereby be pretensioned elastically in the direction of the locked state so that it provides each time when torque is introduced on the output side, directly a locking action while when torque is introduced on the drive side the coil spring has first to be lifted from the associated ring face.

The coil spring is thereby mounted as far as possible on the output side of the servo drive, i.e., preferably between the output element and the stepping up mechanism of the servo drive so that torque introduced on the output side are already locked at the transition from the output element to the stepping up mechanism and cannot first lead to straining the structural groups of the stepping up mechanism.

With the arrangement of the coil spring on the output side of the servo drive it should be noted that in comparison with the drive side (owing to the reducing action of the stepping up mechanism) a lower speed exists there for this but a correspondingly higher drive torque is present than on the drive side. As a result of the higher drive torque also in the opened state of the coil spring brake (freewheel) a comparatively larger friction torque can be tolerated if this is sufficiently small compared with the very large drive torque so that heating and wear remain slight while the high overall efficiency of the servo drive is hardly impaired.

However, with the arrangement of the coil spring on the output side a correspondingly larger stopping moment is to be applied in order to obtain a sufficiently large clamping or braking action. This means that the coil spring has to be dimensioned correspondingly larger, more particularly as regards the cross-section of the spring wire.

For a further reduction of the axial extension the output element can surround the coil spring like a pot and at the same time serve to house those elements which serve to actuate the coil spring when torques are introduced on the drive side and output side, respectively.

The actuation of the coil spring preferably takes place at those two spring ends which for this are each provided with a shift element in a further advantageous embodiment. The spring ends can thereby project radially (preferably owing to the minimizing of the axial structural height) or where necessary also axially from the coil spring.

Through the actuation of the spring ends through shift elements attached thereto it is possible to achieve an improved force transfer during actuation of the spring ends (defined surface pressure with the elements provided for actuating the coil spring) as well as a reduction in the bending strain. Furthermore, a defined guide of these shift elements brings about ensuring a well-defined reproducible shift process to lock and unlock the coil spring, depending on whether torque is introduced on the output side or drive side.

The output element, which is designed as a pot-shaped output disc, can furthermore serve together with the housing of the servo drive for the damp-proof enclosure of the servo drive by sealing the interfaces between the output element, axis and housing.

In order with a small axial structural height, at the same time to provide as anti-tilt security, a sufficiently large axial support length for the output element (on the rotational axis of the servo drive) a connecting element can be integrated in one piece into the output element, e.g., in the form of a positive locking element which is likewise mounted on the rotational axis of the servo drive and which serves to connect the output side with the servo gearing on the output side e.g., a cable drum of a vehicle window lifter. The positive locking attachment of the cable drum on the output element enables a particularly simple uncoupling of the servo drive from the cable drum in the event of servicing.

In order to loosen the coil spring brake when torque is introduced on the drive side, thus to actuate the coil spring so that nothing gets in the way of a transfer of torque introduced on the drive side to the output side, a suitable element of the stepping up mechanism, preferably the element of the stepping up mechanism switched directly in front of the output element has shift regions, e.g., in the form of shift claws with which it can act on the spring ends of the coil spring (namely in particular on the shift elements provided there) in order to lift the coil spring from the associated ring-like, more particularly cylindrical brake surface and thus to unlock same.

Conversely, when torque is introduced on the output side, the output element acts with suitable stop faces on the spring ends of the coil spring so that the latter is pressed with all the greater force against the associated ring like brake surface. The desired locking action is thereby produced which prevents undesired rotation of the output element or a resetting movement of the window pane into the vehicle door. This is the known basic principle of a coil spring brake; depending on whether torque acts on the drive side or output side, i.e., in the present case from the stepping up mechanism or from the output element on the spring ends of the coil spring, this is either lifted from the associated ring-like brake surface or pressed all the more firmly against this brake surface so that either the brake is released (switched free) or the desired braking or locking action is obtained in respect of the torque introduced on the output side.

New here is the integration of such a coil spring brake into a flat design of a servo drive with a disc rotor (disc armature) so that the movable gear elements of the servo drive serving for stepping up, lie in the space enclosed by the coil spring and the elements serving to actuate or shift the coil spring are arranged on the outer circumference of the coil spring (without projecting axially substantially over same). An extremely flat method of constructing the entire arrangement is hereby produced, whereby at the same time the separation between the drive motor and the gearing on the output side, which is standard in servo drives, is eliminated. Rather, the disc rotor (which undertakes the actual motor function in the narrower sense) is combined with the elements of the servo drive on the output side (which form a stepping up gear) into one compact flat structural unit and forms a flat motor with directly integrated gearing, thus one compact flat structural unit which generates the mechanical torque produced on the disc rotor on the one side through electromechanical energy conversion at the disc rotor and on the other side transfers it through the stepping up mechanism on the output side to the output element of the servo drive.

In a preferred further development of the invention an axially fixed axial securing element (e.g., in the form of a disc mounted on the drive axis or in the form of a collar or shoulder) is mounted between the disc rotor and the output element so that axially acting forces (introduced in particular on the output side) are taken up by this securing element and cannot act on the disc rotor. The securing element can be mounted by way of example between the disc rotor and the gearing element of the stepping up mechanism immediately on the output side, or between two axially successive gearing elements of the stepping up mechanism or between the gear element on the output side of the stepping up mechanism and the output element of the servo drive.

The elements of the servo drive lying in front of the axial securing element (seen from the drive side to the output side), thus in particular the disc rotor itself and where necessary a part of the gear elements of the stepping up mechanism are thus decoupled from the axially acting forces introduced on the output side, since these are taken up by the securing element. With the stepping up mechanism designed as a two-stage planetary gearing the gear parts of the first planetary stage preferably also lie in front of the axial securing element next to the disc rotor.

According to a preferred embodiment of the invention the stepping up mechanism acts through damping means in the form of at least one damping or spring element on the output element in order to guarantee a sufficient damping action, thus reduction of torque and force peaks if the output element moves against a block, e.g. because the window pane which is to be adjusted in a motor vehicle through the output element moves into the upper window pane seal.

The damping elements are thereby preferably mounted on the outer circumference of the coil spring partially between the spring ends and corresponding stop faces of the output element so that the at least one damping element becomes deformed when the stepping up mechanism of the servo drive acts with its output side element through the spring ends and damping elements onto the associated stop faces of the output element. This deformation is further intensified if the torque acting on the servo drive strives to reach maximum when moving up to a block. The corresponding energy absorption in the damping element thus prevents the appearance of excessively high torque peaks.

The arrangement is thereby designed so that a resetting movement of the shift regions which is triggered when the deformed damping element relaxes is less than the reverse play of the locking mechanism in order to prevent disengagement of the coil spring. By reverse play of the locking mechanism is meant that path which has to be covered by the shift regions (shift claws) provided for actuating the coil spring at the spring ends in order to pass for example by corresponding actuation of the coil spring from a rotational movement along a first direction (e.g., counter-clockwise rotation) into a rotational movement along the opposite direction (e.g. clockwise rotation). Through the design of the damping elements it is consequently prevented that as a result of the resetting action of the relaxing damping elements the coil spring could be released for a rotational movement opposite to the direction along which the servo drive had previously been moved into a block, namely the window pane into an upper pane seal. A reliable locking of the coil spring brake is hereby guaranteed without the danger existing that the coil spring brake is disengaged for an opposite rotational movement of the servo drive (as a result of the resetting action of the damping elements).

The damping elements are preferably guided in associated guide devices, which can be formed, by way of example, on the output element.

An additional damping effect on moving up into a block can be achieved through an axial and/or radial friction interaction of the element on the output side of the stepping up mechanism with the output element of the adjusting mechanism. This hereby involves obtaining a controlled friction between the end face regions or circumferential face regions of the output element and the element of the stepping up mechanism connected indirectly in front on moving up into a block or during relaxation of the damper after switching off the drive. This can be achieved for example through an axial tensioning of the damping elements which is provided anyhow or through the interaction of the two aforementioned elements through wedged or ramp shaped friction faces.

In order with a flat construction of the servo drive, thus a corresponding small support length of the individual elements of the stepping up mechanism along the rotational axis, to position the gear elements of the stepping up mechanism as secure as possible against tilting on the rotational axis, the gear element on the output side is mounted in the axial direction on the output element, for this can produce a comparatively longer support length through the integral design with a connecting or positive locking region for coupling a gear part on the output side, such as e.g. a cable drum. The axial bearing can be achieved, for example, in that radially extended webs are provided on the output element with undercut sections in the base region of the output element in which engage the gear element of the stepping up mechanism connected in front on the input side. For the gear element to engage in these undercut sections the gear element can be provided with recesses which correspond with the webs and thereby enable an interaction of the gear element of the stepping up mechanism and of the output element in the manner of a bayonet lock.

The stepping up mechanism is in a preferred embodiment of the invention formed by a revolving wheel gearing, more particularly in the form of a planetary gearing, or gearing based on a relative movement between two hollow wheels mounted coaxial relative to each other and having internal teeth in different numbers which engage with a common drive element. Examples of these can be found in DE 197 08 310 A1, DE 100 24 905 A1 and DE 100 24 908 A1.

In the case of the stepping up mechanism being designed as planetary gearing the movable elements of the stepping up mechanism serving for the stepping up are mounted inside a hollow wheel on whose internal teeth roll the gear elements of the stepping up mechanism, e.g., the planets of the individual stages of a single-stage or multi-stage preferably two-stage planetary gearing. By the coil spring engaging around this hollow wheel and thereby preferably at the same time utilizing the outer peripheral face of the hollow wheel which is not provided with teeth as a ring-type braking surface, the intended flat structure of the overall arrangement is achieved whereby the coil spring encloses the stepping up mechanism which is formed by a revolving wheel gearing.

In a preferred embodiment, it is further proposed that the electrical connections of the electromechanical energy converter (motor connections of the servo drive) are short-circuited on switching off the servo drive in order to produce a temporary state of inertia on the drive side through counter induction on the disc rotor and thus to guarantee a sufficiently large time window for a secure locking of the coil spring. An electrical braking effect is thus hereby achieved temporarily which as with the design of the damping elements illustrated above is to ensure that on switching off the servo drive, e.g., after this has moved into a block, no unintended disengagement of the coil spring brake in the opposite rotational direction takes place. As soon as the coil spring has occupied its locking position under the action of its pretension the required locking action is solely provided by the coil spring brake, whereby the locking action is based not only on the pretension of the coil spring but with the introduction of torque on the output side is even intensified in that the windings of the coil spring are pressed against the associated ring-type brake face (through actuating of the spring ends on the output side).

In a further preferred development of the invention a reference point system is integrated into the multi-part housing of the servo drive in order to be able to align the individual housing parts and, where applicable, a bearing cover relative to each other and to be able to install these again in the correct position relative to the supporting part, more particularly supporting vehicle part on which the servo drive is to be mounted and fixed. The housing of the servo drive is thereby preferably formed in two or three parts, with a so-called outer housing part on the disc rotor side and a so-called inner housing part on the output side, as well as where applicable a third housing part in the form of a bearing cover.

The magnets required to generate a rotational movement of the disc rotor (or armature disc) which act on the conductors of the disc rotor through which the current flows, and which are mounted on one or both sides next to the disc rotor and are fixed on the relevant housing part of the drive housing are preferably designed as regards to their geometry so that they are adapted to the path of the electric conductor of a winding of the disc rotor, whereby at the same time the simplest possible manufacture of the individual magnets can be achieved. For this, the magnets are designed so that with a predetermined size they substantially cover the most possible conductor elements of the disc rotor which are energized in the same direction. I.e., the path of the outer contour of the magnets is adapted to the path of the electrical conductor of a winding of the disc rotor. Radially towards the center, however, the magnets are thereby cut in a circular arc so that the radially inner sections of the electrical conductors of the disc rotor are not covered. A half-moon shaped geometry of the magnets is hereby produced.

BRIEF DESCRIPTION OF THE DRAWINGS

Further features and advantages of the invention will now be apparent from the following description of embodiments given with reference to the drawings.

DETAILED DESCRIPTION

Using FIGS. 1, 2 and 3, the basic construction will now be described of a servo drive for a motor vehicle window lifter which is characterized by a low structural height in the axial direction through the inclusion of a separate locking device in the form of a coil spring brake which has only a slight effect on the efficiency. The gear assembly through which the drive side is coupled to the output side of the servo drive is not shown in FIG. 3 which relates more particularly to the design of the output side of the servo drive and its connection to a cable drum which is mounted in a bearing cover. Details regarding the design of the electromechanical converter of the servo drive formed by a disc rotor with associated magnets and a current supply will be described with reference to FIG. 4. Finally, the interaction of the gear elements of the servo drive with the associated coil spring brake will be explained in detail with reference to FIGS. 5a to 5c.

Figure 1:
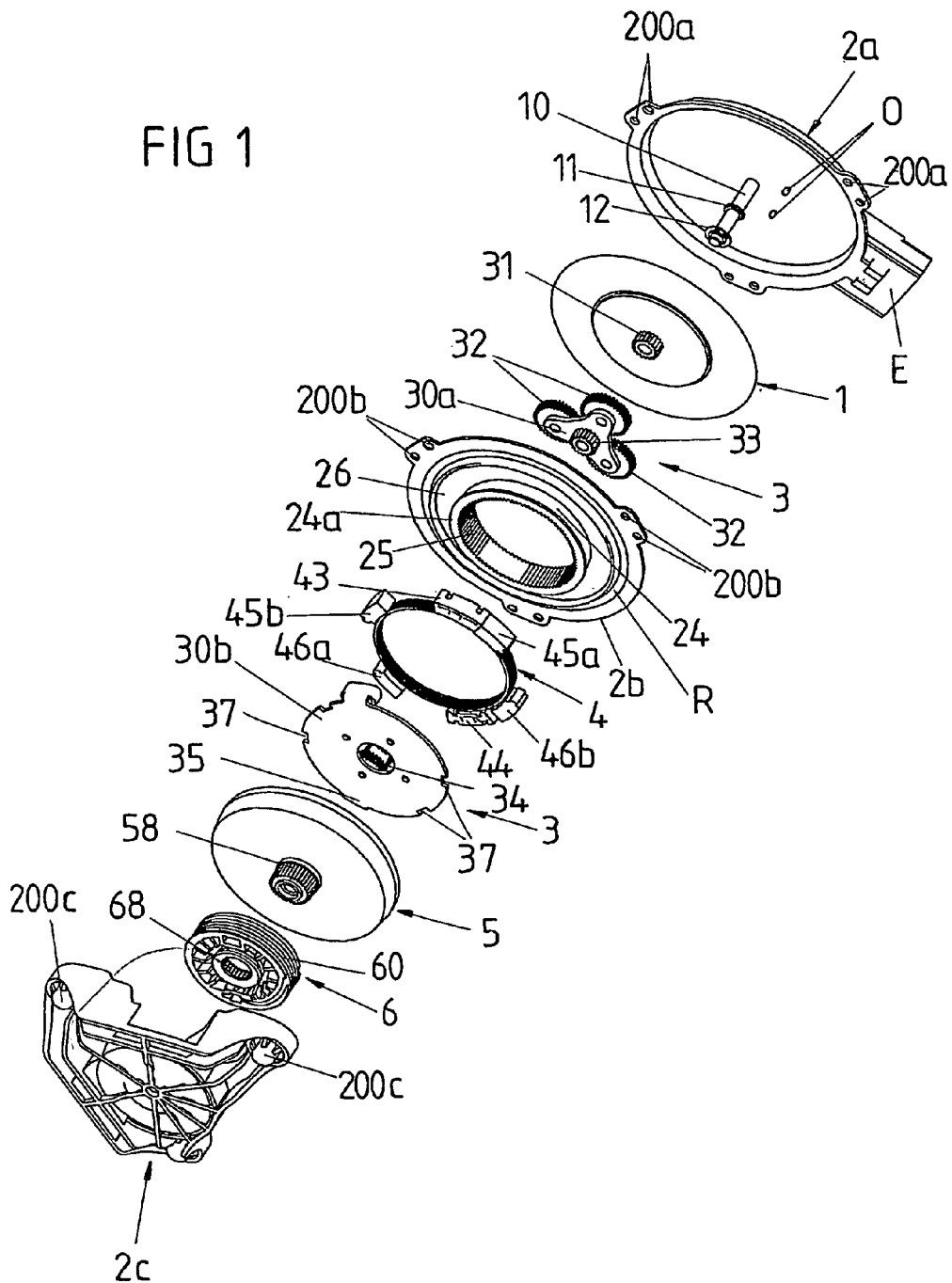
FIG. 1 is a perspective exploded view of a servo drive for a motor vehicle window lifter.
Figure 2:
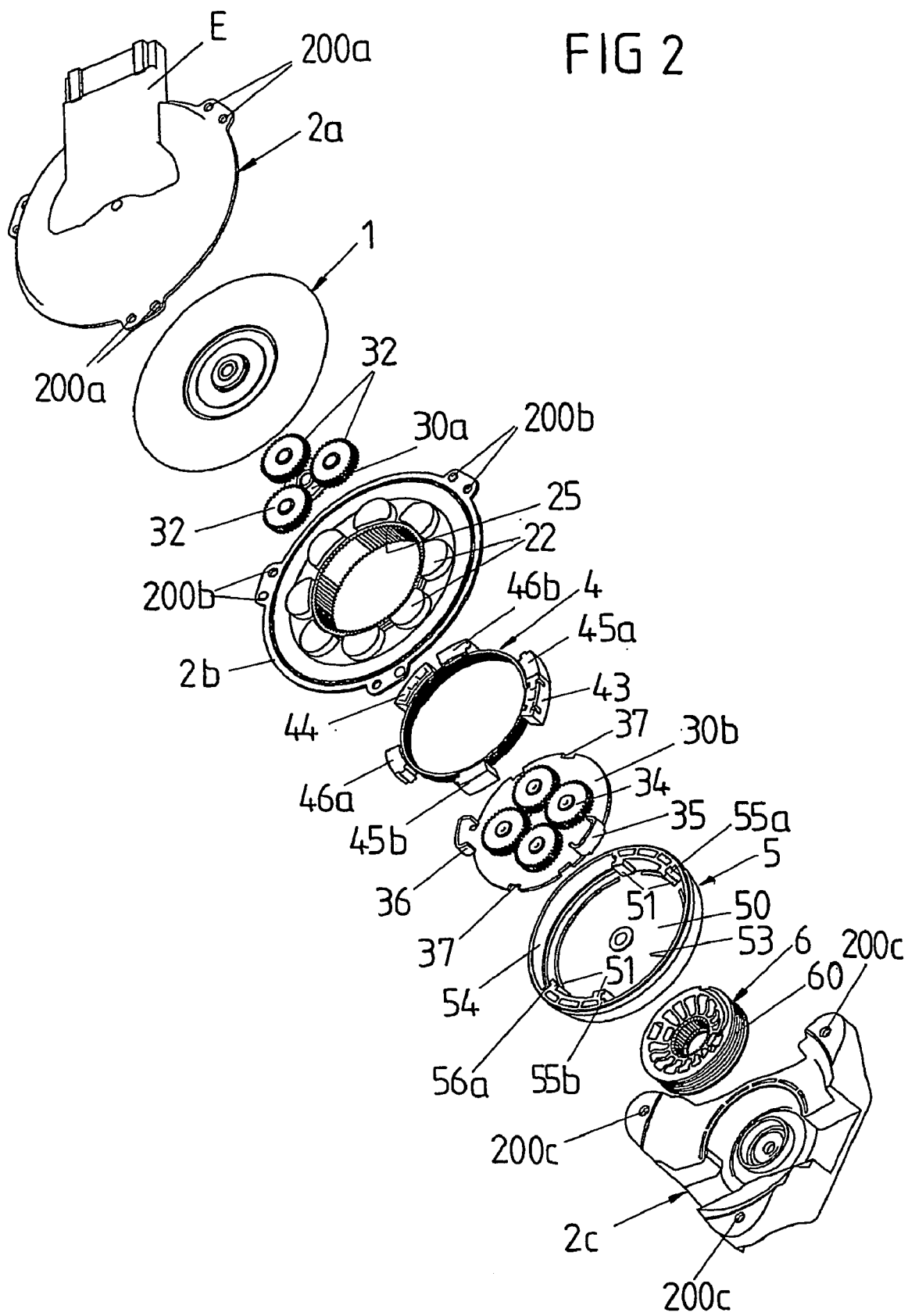
FIG. 2 is a second perspective exploded view of the servo drive of FIG. 1.

According to FIGS. 1 and 2 the servo drive comprises an electromechanical energy converter having a disc rotor 1 mounted on a locally fixed rigid axis 10 (fixed drive axis) which involves an armature disc through which a current flows. When the electrical conductors which are formed or are mounted on the disc rotor 1 are energized, a torque is produced through the influence of the magnetic field through magnets 22 associated with the disc rotor 1 and arranged ring-like in succession, whereby this torque causes the disc rotor 1 to rotate about the fixed axis 10 along one or the other rotational direction depending on the direction of the current flow. Corresponding magnets 22 can thereby be mounted selectively only over one surface (as in FIGS. 1 and 2) or over both surfaces of the disc rotor 1. A particularly advantageous geometric design of the magnets 22 in relation to the path of the electrical conductors of the disc rotor 1 will be explained in further detail below with reference to FIG. 4.

The fixed axis 10 on which the disc rotor 1 is mounted rotatable is fixed on an outer housing part 2a which more particularly holds the disc rotor 1 and is therefore also termed a housing part 2a on the disc rotor side. On the housing part 2a of the servo drive on the disc rotor side there is an energy supply and control module E which contains the electrical components which are required to energize the disc rotor 1 and to control its rotational movement. In order to enable the electrical conductors of the disc rotor 1 to be energized by the electronics module E, openings O are provided in the outer housing part 2a on the disc rotor side through which brushes mounted on the energy supply and control module E project into the interior of the housing part 2a where they come into contact with the disc rotor 1.

Figure 3:
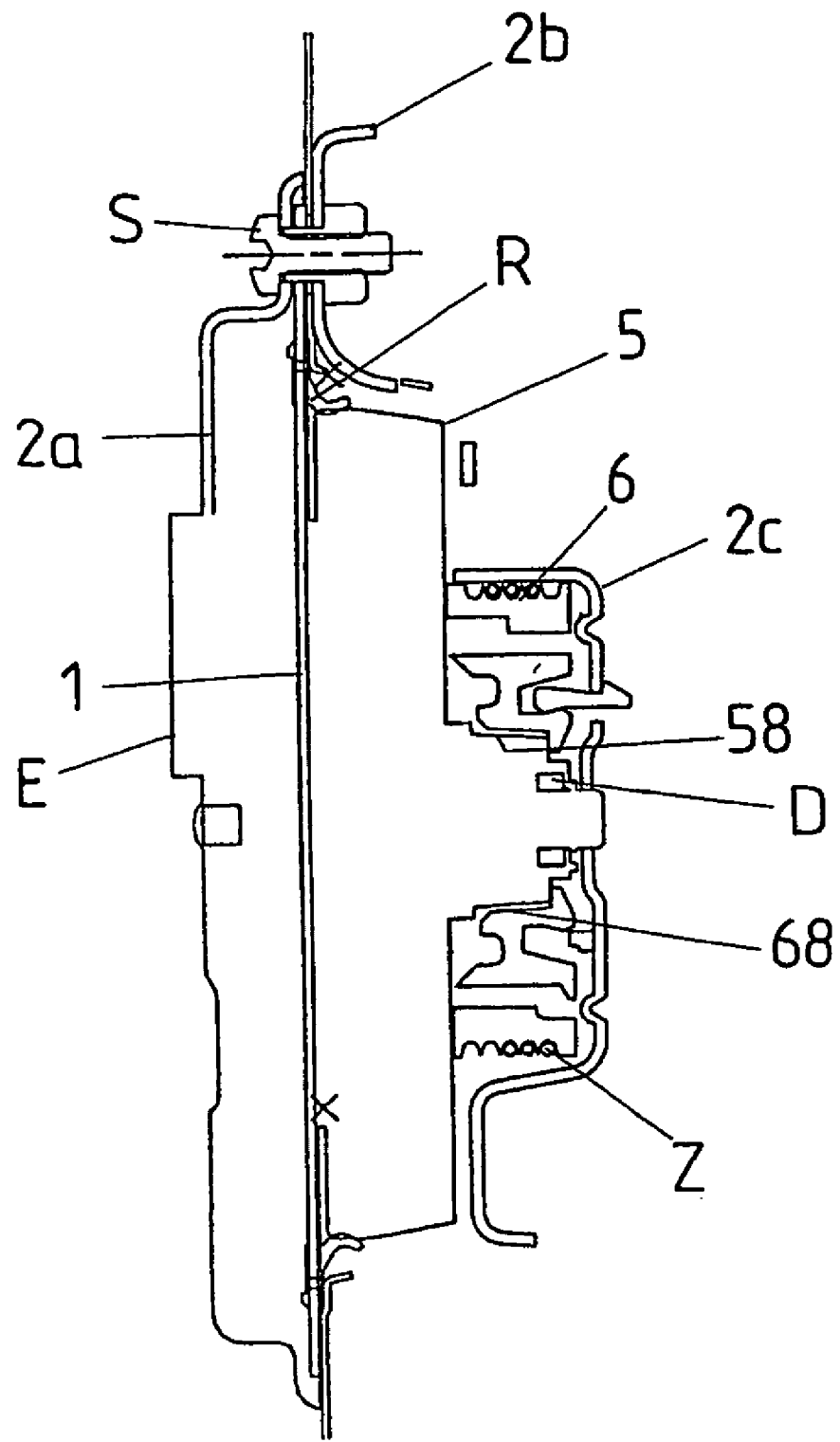
FIG. 3 is a diagrammatic section through the servo drive of FIGS. 1 and 2 with a bearing cover for a cable drum which is mounted on the output side and is to be driven through the servo drive—but without showing the gear elements through which the cable drum is coupled to the electromechanical energy converter on the drive side.

The outer housing part 2a on the disc rotor side is also provided with fixing points 200a for connecting this housing part 2a to further housing parts 2b, 2c, e.g., through fixing elements in the form of screws S, see FIG. 3.

A toothed wheel 31 (toothed pinion or sun gear) is mounted (pressed in) coaxially on the disc rotor 1 and serves as an input stage for a stepping up mechanism 3 which is mounted on the output side of the disc rotor 1 and with which the torque generated at the disc rotor 1 is transferred to an output element or disc 5 and thereby stepped down (here in particular reduced). This stepping down mechanism 3 is currently formed here as a revolving gear in the form of a (two-stage) planetary gear wherein the toothed wheel 31 mounted on the disc rotor 1 forms a sun wheel of the first gear stage of the planetary gear 3.

Three planetary wheels 32 which are each mounted rotatable on a planet carrier 30a of the first planetary stage and are in engagement with the sun wheel 31 are associated with the sun wheel 31 of the first gear stage of the planetary gear 3 which (sun wheel) is mounted coaxial with the disc rotor 1 and is connected rotationally secured thereto. This planet carrier 30a is in turn mounted coaxial with the disc rotor 1 rotatable on the fixed axis 10 of the servo drive and on its side remote from the disc rotor 1 is connected rotationally secured to a further toothed wheel 33 (toothed pinion) which serves as sun wheel for a second stage of the planetary gear 3 and likewise is mounted rotatable on the fixed axis 10 of the servo drive. The said toothed wheel 33 and the planet carrier 30a are thereby preferably made in one piece (moulded against each other).

The sun wheel 33 of the second planetary stage is assigned, by way of example, four planetary wheels 34 overall which are mounted rotatable on a planet carrier 30b of the second gear stage and which each engage with the sun wheel 33 of the second gear stage.

Both the planetary wheels 32 of the first gear stage and also the planetary wheels 34 of the second gear stage each run over the internal teeth of a hollow wheel 25 of the planetary gear 3. This hollow wheel is formed on an inner housing part 2b which engages around the planetary gear and which will also be termed below as a housing part on the gear side. This inner housing part 2b on the gear side has in turn fixing points 200b in the form of fixing openings for connecting to the outer housing part 2a on the disc rotor side.

The hollow wheel 25 is formed on a ring-shaped peripheral collar which protrudes axially from the inner housing part 2b and which forms at the same time a brake surface 24 for a coil spring brake 4 of the servo drive. The coil spring brake 4 can be held on this ring-shaped cylindrical peripheral brake surface 24 whereby this spring is axially secured between a surface of the second housing part 2b and a peripheral radial collar on the ring-shaped brake surface 24. A sealing ring R (with a sealing lip) is furthermore mounted on the inner housing part 2b on the gear side in order to seal the gear from the output side.

The inner housing part 2b serves at the same time to house the magnets 22 which are associated with the disc rotor 1. Corresponding to the arrangement of the magnets 22 on only one side already described here there are no magnets provided on the outer housing part 2a on the disc rotor side. With an arrangement of corresponding magnets on either side of the disc rotor 1, thus over its two surfaces, corresponding magnets can be arranged ring-like in succession both on the outer housing part 2a on the disc rotor side and on the inner housing part 2b on the gear side.

From FIG. 1 it is clear that an axial securing element 11 is mounted on the fixed axis 10 of the servo drive roughly in the middle (viewed in the axial direction) where it is fixed axially immovable and divides the servo drive in the axial direction into two drive groups. The first drive group, consisting of the disc rotor 1, the sun wheel 31 and the associated planetary wheels 32 of the first gear stage and the sun wheel 33 of the second gear stage is mounted jointly on a section of the fixed axis 10 which extends between the outer housing part 2a on the disc rotor side and the axial securing element 11. The axially adjoining gear elements 33, 5 of the servo drive are, seen from the disc rotor 1, mounted on the other side of the axial securing element 11.

The axial securing element 11 causes an axial uncoupling of the disc rotor 1 as well as its first gear stage 31, 32 of the planetary gear 3 and of the sun wheel 33 of the second gear stage connected to the planet carrier 30a of this first gear stage, from the gear elements mounted further out on the output side, namely the planetary wheels 34 of the second gear stage with the associated planet carrier 30b and the output element 5. Thus, axially acting forces introduced on the output side cannot pass to the disc rotor 1 and the gear elements 31, 32, 33 mounted directly behind.

Thus, the disc rotor 1 and the gear elements 31, 32, 33 of the planetary gear 3 directly on the output side are uncoupled as far as the axially acting forces are concerned from the output side of the servo drive. Such axially acting forces can be caused for example when using the servo drive for operating a cable window lifter in that the drive cable serving as the draw means does not run precisely tangentially into a cable drum 6 which is to be driven with the servo drive, thereby producing axially acting forces.

From FIG. 1 it is also clear that the pot-shaped output element or disc 5 mounted on the other side of the axial securing element 11 is axially mounted and secured at its axial end remote from the planetary gear 3 (thus at its end of the positive locking element 58) on the output side) by of a second axial securing device 12 which is fixed on the fixed axis 10. This axial securing device 12 also acts indirectly on the cable drum 6 which is positively fixed on the output disc 5. Furthermore, at that axial end of the fixed axis 10 is a sealing ring D (shown in FIG. 3) which is housed between the positive locking element 58 of the output disc 10 and the second axial securing means 12 in order to prevent moisture, dust or the like from entering into the servo drive from the output side.

The coil spring brake 4 mounted on the ring-like brake face 24 of the second inner housing part 2b is pretensioned so that it has a tendency to bear with friction against the ring-like brake face 24 and, in the event of torque introduced on the output side, to generate a locking action which prevents the transfer of torque introduced on the output side into the servo drive over to the drive side, i.e. in particular to the disc rotor 1.

Since the ring like brake face 24 forms the outer surface of the collar provided on the inner housing part 2b whose inner surface is provided with teeth serves as a hollow wheel 25 for the planetary gear 3, the coil spring 4 bearing against the ring like brake face 24 at the same time also surrounds all the movable gear elements 30a, 30b, 31, 32, 33, 34 of the planetary gear 3, except for the shift regions (shift claws 35,36) provided on the planet carrier 30b of the second gear stage which serve to actuate the coil spring 4. Through this arrangement of the coil spring brake 4 on the outer periphery of the stepping up mechanism (planetary gear 3) of the servo drive the coil spring brake does not lead to the need for additional structural space in the axial direction of the servo drive.

The spring ends 41, 42 (see FIGS. 5b and 5c) of the coil spring 4 which for this purpose are each provided with shift elements 43, 44 in which the spring ends 41, 42 are radially inserted, serve to actuate the coil spring 4 with the aim of either lifting it (with torque introduced on the drive side by means of the disc rotor 1) from the ring-like brake face 24 or on the other hand pressing it (with torque introduced on the output side via the cable drum 6) firmly against the ring-like brake face 24. Each shift element 43, 44 is assigned a shift claw 35, 36 of the planet carrier 30b of the second gear stage of the planetary gear 3 whereby depending on the rotational direction of the disc rotor 1 the one or other shift claw 35, 36 acts on the one or other shift element 43, 44 of the coil spring 4 in order to lift this from the ring-like brake face 24 to enable the transfer of torque introduced on the input side to the output side.

The transfer of torque to the output side is carried out in that the planet carrier 30b of the second gear stage and the coil spring 4 are mounted in an output element in the form of the pot-shaped output element or disc 5 where the shift claws 35, 36 can act through the shift elements 43, 44 of the coil spring 4 as well as through additional damping elements 45a, 45b; 46a, 46b on corresponding stop faces 55a, 55b; 56a, 56b of the pot-shaped output disc 5.

The shift claws 35, 36 of the planet carrier 30b of the second gear stage thus serve not only to disengage the coil spring 4 when torque is introduced on the drive side through the disc rotor 1, but more particularly also serve as force transfer elements through which torque introduced on the drive side (through corresponding stop faces 55a, 55b; 56a, 56b) is transferred to the output disc 5.

A defined stepping up of the torque produced on the disc rotor 1 to the output side is thereby reached by means of the two gear stages of the planetary gear 3, namely a stepping up in the form of a so-called reduction. I.e., the planet carrier 30b of the second gear stage of the planetary gear 3 rotates about the fixed axis 10 at a considerably slower speed (determined by the transmission ratio) than the disc rotor 1, but a correspondingly larger drive torque is thereby provided. Correspondingly large adjusting forces can hereby be provided with defined adjusting speeds for operating a window lifter.

As can be seen in particular from FIG. 2, the planet carrier 30*b* of the second gear stage of the planetary gear is mounted and axially supported in the pot-like output disc 5 in the manner of a bayonet lock. For this, recesses 37 are provided at the outer edge of the planet carrier 30*b* of the second gear stage and can be pushed over corresponding inwardly projecting webs 51 of the output disc 5 (in the axial direction). As soon as the planet carrier 30*b* is pushed axially onto the bottom 50 of the pot-shaped output disc 5 the latter can be turned relative to the output disc 5 about the common axis of rotation whereby the outer edge of the planet carrier 30*b* of the second gear stage engages in undercut sections which are formed between the individual radially inwardly projecting webs 51 and the bottom 50 of the pot-shaped output disc 5. The planet carrier 30*b* of the second gear stage is hereby mounted axially between the housing base 50 and the webs 51 of the output disc 5 and is guided parallel to the drive disc (secured against tilting).

The output disc 5 itself is in turn secured against tilting in that it is connected rotationally secured (preferably integral) with a coaxially mounted positive locking element 58 which serves to produce a positive locking connection with a cable drum 6 which has a positive locking region 68 associated with the positive locking element 58 and whose outer surface 60 has grooves for guiding the drive cable of a cable window lifter. Through the positive locking element 58 which is connected rotationally secured to the output disc 5 and extends in the axial direction the effective axial support length of the output disc 5 is maximised and an anti-tilt lock is produced (against tilting relative to the drive axis 10).

With its inner faces 53, 54 which run between the stops 55*a*, 55*b*; 56*a*, 56*b* the output element 5 forms together with the inner housing part 2*b* one guide for the shift element 43, 44 as well as the damping elements 45*a*, 45*b*; 46*a*, 46*b* through which the shift claws 35, 36 of the planet carrier 30*b* of the second gear stage can act on the output disc 5.

The output disc 5 engages pot-shaped around the planet carrier 30*b* of the second gear stage as well as the coil spring 4 and thereby bears in particular against the sealing ring R of the inner housing part 2*b* on the gear side. It hereby helps to seal the servo drive.

The cable drum 6 which is mounted on the output side of the output disc 5 is in turn mounted in its own housing part 2*c* in the form of a bearing cover which is fixed with the other housing parts 2*a*, 2*b* by fixing points 200*c*. The bearing cover 2*c* furthermore serves to radially support the fixed axis 10 of the servo drive at its end remote from the outer housing part 2*a* on the disc rotor side, whereby the fixed axis 10 is fixed on this housing part 2*a* for example by rivets and at that bearing cover projects into a bearing opening where it is radially fixed.

The fixing spots 200*a*, 200*b*, 200*c* of the individual housing parts 2*a*, 2*b*, 2*c* can serve as a reference point system for aligning and positioning the housing parts 2*a*, 2*b*, 2*c* relative to each other as well as the entire servo drive 1, 2*a*, 2*b*, 3, 4, 5, including the cable drum 6 on a supporting vehicle component, such as e.g., a door panel.

Whereas the cable drum 6 and the output disc 5 are preferably made of plastics, the disc rotor 1, the planetary gear 3, coil spring 4, bearing cover 2*c* as well as the two housing parts 2*a*, 2*b* of the servo drive are preferably made of metal.

An important characteristic of the servo drive illustrated in FIGS. 1, 2 and 3 lies in the fact that it is a very flat drive in the axial direction whereby the conventional division between motor and adjusting gear on the output side is omitted insofar as the electromechanical energy converter 1, 22 which undertakes the motor function, as well as the gear assemblies 3, 5 on the output side are combined into one unit which is mounted in or on a single two-part drive housing 2*a*, 2*b* and which in addition to converting electrical energy into mechanical energy also undertakes transferring the drive torque to the output side. The coil spring brake is thereby adapted to this flattened drive so that it requires no additional structural space in the axial direction.

Figure 4:
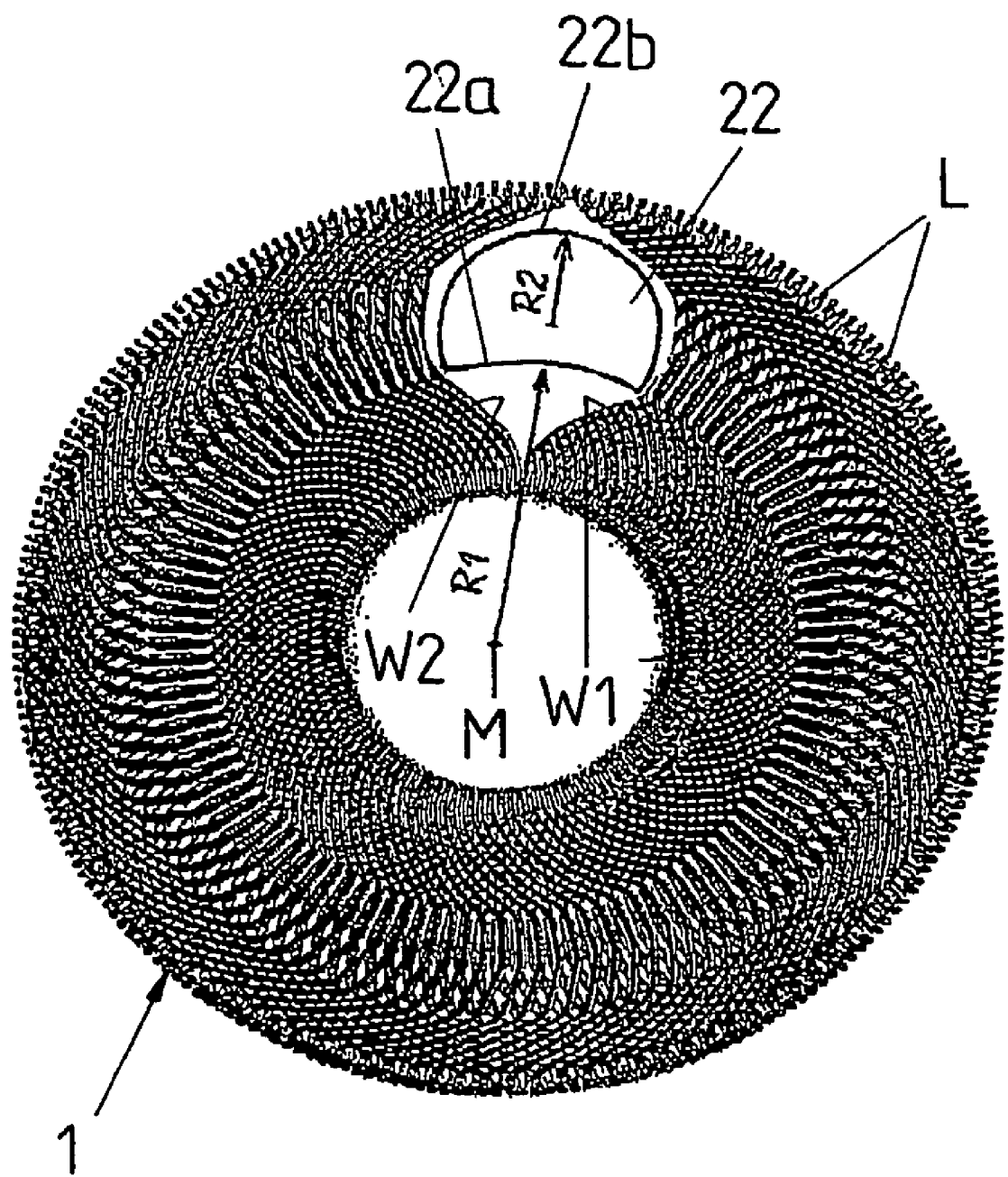
FIG. 4 is a detailed view of the arrangement of the magnets associated with the disc rotor.

FIG. 4 shows further details regarding the geometrical design of the magnets 22 which in accordance with FIG. 1*b* are fixed on the inner housing part 2*b* on the gear side engaging ring fashion round the fixed axis 10. For this FIG. 4 shows the disc rotor 1 which is formed from electrical conductors L diagrammatically together with one of the magnets 22 which are mounted in front of a surface of the disc rotor 1.

The electrical conductors L forming the disc rotor 1 exist in the form of preferably flat stamped windings of which two winding sections W1, W2 of one winding are highlighted by way of example in FIG. 4 through a partial section into the disc rotor 1. It is thereby particularly clear that the outer contour of the magnet 22 is adapted to the path of the windings (e.g., the winding sections W1, W2) of the disc rotor 1. On its side remote from the center M of the disc rotor 1 the outer contour 22*b* of the magnet 22 is formed by a circular arc section with a radius R2 which is selected so that the circular arc section 22*b* remote from the center M of the disc rotor 1 matches in curvature the curvature of the windings W1, W2. At its side facing the center M of the disc rotor 1 the magnet 22 is defined by a further circular section 22*a* whose radius R1>R2 is determined through the distance from the center M of the disc rotor 1. The magnets 22 are hereby cut back on their side facing the center point M of the disc rotor 1 so that they no longer follow the contour of the windings W1, W2 at their end sections facing the center M of the disc rotor 1.

As a result the magnets 22 used for operating the disc rotor 1 and whose magnetic fields interact with the windings W1, W2 of the disc rotor 1 through which current flows are adapted by their outer contour 22*a*, 22*b* substantially to the path of the windings W1, W2. However, a cost effective production method is ensured for the magnets 22 since their outer contour 22*a*, 22*b* is provided in cross-section through two circular arc sections 22*a* and 22*b*.

The introduction into the output disc 5 of the drive torque generated at the disc rotor 1 and stepped up by means of the stepping-up mechanism in the form of a planetary gearing 3 while simultaneously disengaging the coil spring brake will now be described with reference to FIGS. 5*a* to 5*c*.

Figure 5A:
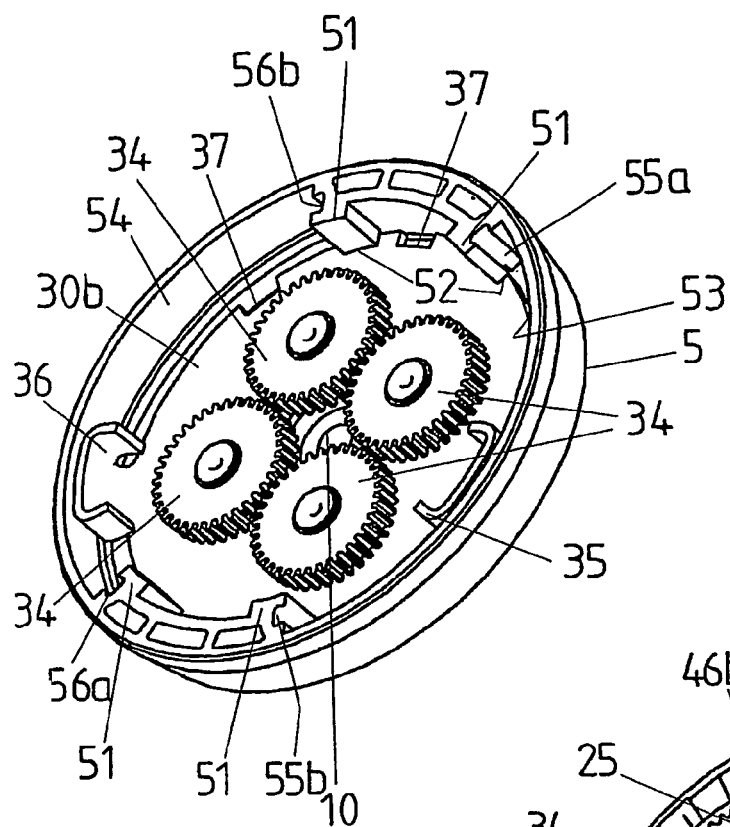
FIGS. 5a to 5c are three illustrations of the interaction of gear elements of the servo drive with an associated coil spring brake.

FIG. 5*a* thereby first shows the planet carrier 30*b* of the second gear stage which serves for the rotatable bearing of the corresponding planet carrier 34, together with the pot-shaped output disc 5 in which the planet carrier 30*b* is housed and supported.

In order to bring together the planet carrier 30*b* and the output disc 5, the planet carrier 30*b* is placed on the base surface 50 (see FIG. 1*b*) of the pot-shaped output disc 5 whereby the recesses 37 at the outer edge of the planet carrier 30*b* are each guided along one of the inwardly projecting webs 51 of the output disc 5. As soon as the planet carrier 30b rests on the base 50 of the output disc 5 the latter is turned slightly relative to the output disc 5 so that the recesses 37 at the edge of the planet carrier 30b move out of engagement with the webs 51. The outer edge of the planet carrier 30b is hereby housed positively in undercut sections 52 which are formed between the webs 51 and the base 50 of the output disc 5. Through this axial securing of the planet carrier 30b on the output disc 5 tilting of the planet carrier 30b relative to the output disc 5 is prevented (in the manner of an axially acting bayonet lock). At the same time the planet carrier 30b and the output disc 5 are rotatable restricted relative to each other about the fixed axis 10 of the servo drive which is of importance for the transfer of the drive torque from the planet carrier 30b to the output disc 5 with the interposition of a coil spring brake.

Figure 5B:
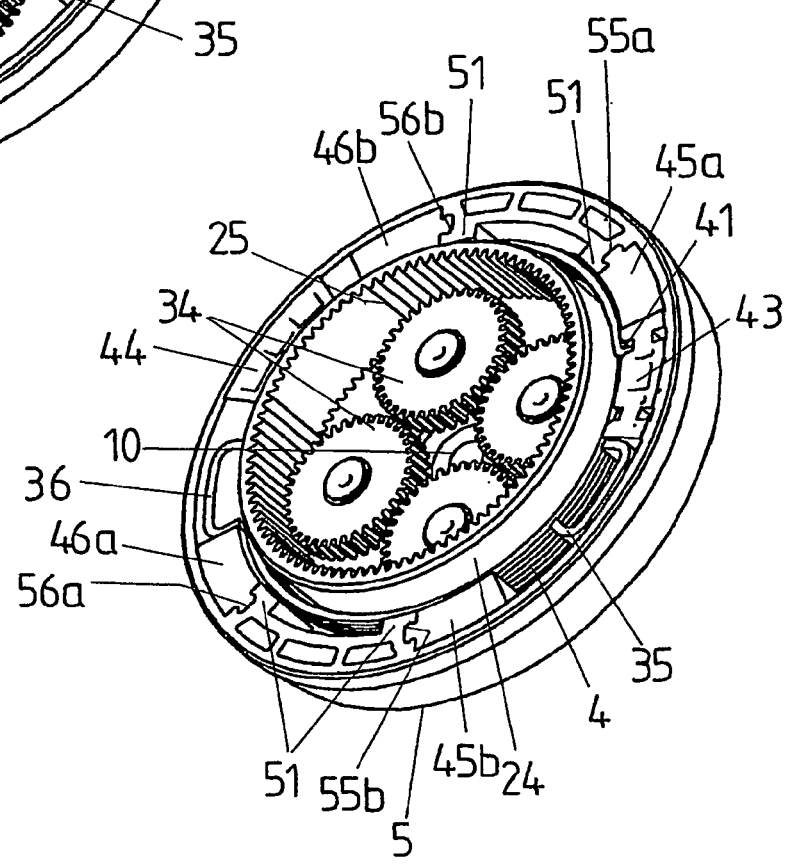
Figure 5C:
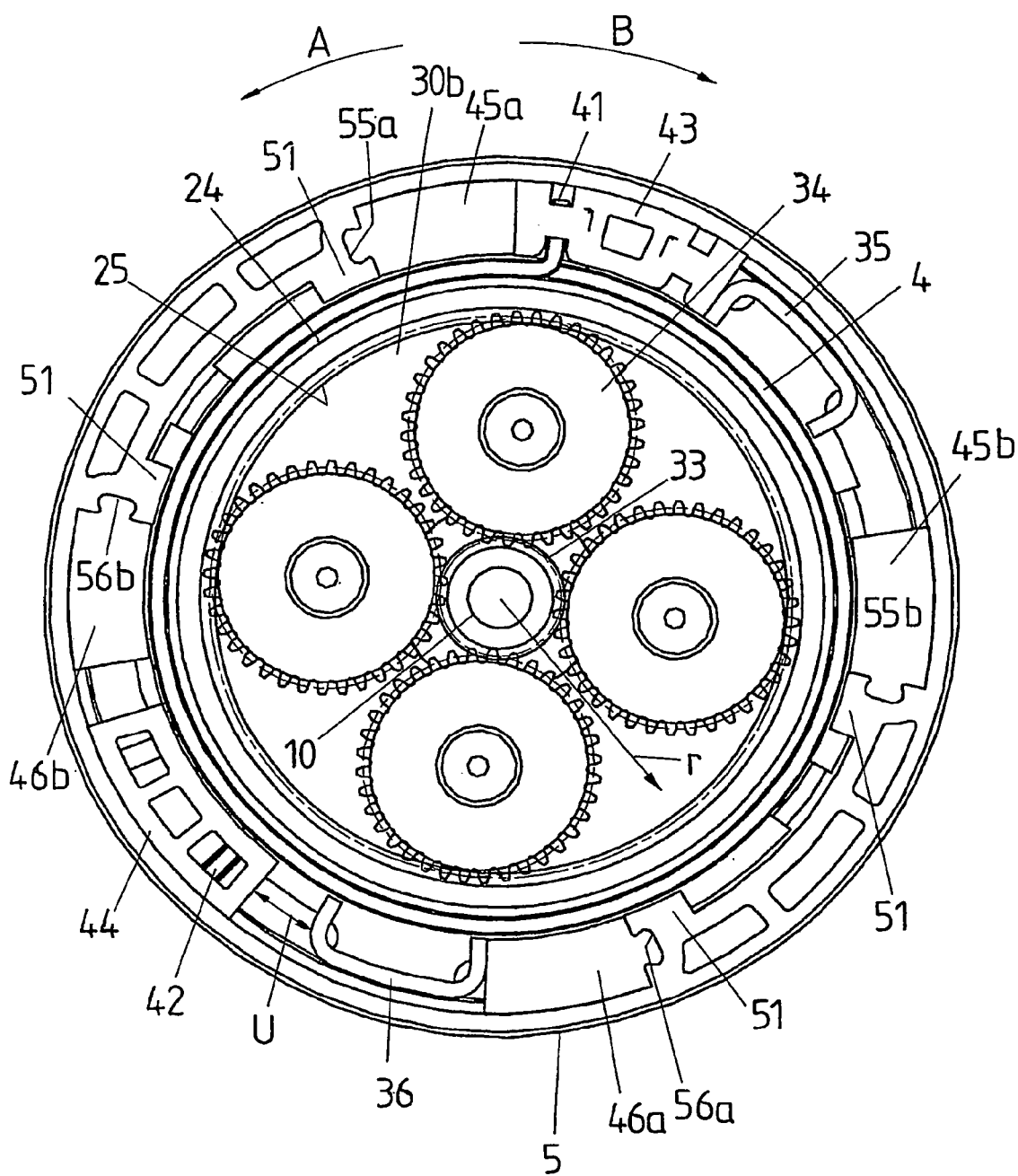

FIG. 5b shows the gear assembly comprising the planet carrier 30b of the second gear stage and the output disc 5 together with the hollow wheel 25 formed on the inner housing part 2b on the gear side (see FIGS. 1 and 2) or fixed as a separate part in the housing, for the planets 32, 34 of the planetary gear 3 and coil spring 4. The coil spring 4 engages around the cylindrically formed ring face of the inner housing part 2b or hollow wheel 25 so that its ring-like cylindrical outer wall serves as the brake surface for the coil spring 4. I.e., in order to block torque introduced on the output side, the coil spring 4 is placed radially inwards with correspondingly large force against the brake surface 24 of the inner housing part 2b.

For actuating the coil spring 4, both for disengaging the coil spring brake when introducing torque on the drive side and also for blocking the coil spring brake when torque is introduced on the output side, the two spring ends 41, 42 are used which each protrude radially from the coil spring and are provided with shift elements 43, 44 which are fixed, more particularly pushed on to the spring ends 41, 42. The shift elements 43, 44 enable a defined introduction of shift forces and large locking forces into the coil spring 4 without the spring ends 41, 42 bending. With a given thickness of spring wire greater torques can hereby be transferred, e.g., as a result of an attempted break-in by pressing down a window pane. In that the shift elements 43, 44 match in contour the curvature of the inner wall of the pot shaped output disc 5 they can be radially outwardly supported on same so that the corresponding wall regions 53, 54 of the inner wall of the pot shaped output disc 5 serve at the same time as guide regions for radially guiding the shift elements 43, 44 in the circumferential direction. The axial guidance of the shift elements 43, 44 preferably takes place through the spring ends 41, 42, and a contact bearing face 26 of the shift elements 43, 44 against the inner housing part 2b in order to introduce axial forces from the shift elements into the housing part 2b when the coil spring brake is locked.

Furthermore, the shift elements 43, 44 enable force to be introduced over a comparatively large surface area into the spring ends 41, 42 and the damping elements 45a, 46b by means of the shift claws 35, 36 of the planet carrier 30b of the second gear stage whereby the stop faces of the shift elements 43, 44 interacting with the shift claws 35, 36 evening out the force introduction as pressure members.

The shift claws 35, 36 provided on the planet carrier 30b thereby serve not only to disengage the coil spring brake when torque is introduced on the drive side, but they also serve as force introduction or force transfer elements in order to transfer the torque acting on the drive side depending on the direction of rotation through the shift element 43 or 44 and the damping elements 45a, 46a or 46b, 45b to the output disc 5. For this, corresponding stop faces 55a, 56a and 56b, 55b are provided on the output disc 5 and each protrude inwards from the inner wall of the pot shaped drive disc 5 and of which each two (55a, 55b, or 56a, 56b) are assigned to each of the shift claws 35, 36 engaging in the output disc 5. Of each pair 55a, 55b and 56a, 56b of stop faces which are each assigned to a force transfer or force introduction element in the form of a shift claw 35, 36, during a rotational movement of the servo drive only one stop face 55a or 55b, or 56a or 56b is active per shift claw 35, 36—in dependence on the relevant direction of rotation—in that it enters into active connection with the associated shift claw 35 or 36 (indirectly through damping elements 45a, 45b; 46a, 46b).

For damping a torque introduced into the output disc 5 on the drive side by the shift claws 35, 36 through the associated stop faces 55a, 55b; 56a, 56b, particularly when the servo drive moves into a lock on the output side, e.g., because a window pane to be adjusted has reached its final closing position in an upper pane seal, there are damping elements 45a, 45b; 46a, 46b which are inserted by a projection serving as a plug element into each one of the stop faces 55a, 55b; 56a, 56b of the output disc 5 which are designed as counter sockets.

The introduction of drive torque generated on the drive side at the disc rotor 1 through the planetary gearing 3 into the output disc 5 with the simultaneous disengagement of the coil spring brake will now be described with reference to FIG. 5c by way of example for a rotational movement along a first direction A (corresponding to an counter-clockwise rotation in the view according to FIG. 5c).

A rotational movement of the disc rotor along a first rotational direction A about the fixed axis 10 of the servo drive leads to a movement in the same direction of the planet carrier 30b of the second planet stage, but—according to the selected transmission ratio—with a slower speed and a greater drive torque. The two shift claws 35, 36 of the planet carrier 30b serve to introduce the corresponding torque into the output disc 5. As can be seen from FIG. 5c, during rotational movement of the planet carrier 30b along the first rotational direction A the one shift claw 35 acts on the shift element 43 of the one spring element end 41 and hereby has the tendency to radially widen the coil spring 4 so that it is lifted in the radial direction r (in relation to the drive axis 10) from the brake face 24 of the coil spring brake. The coil spring brake is hereby disengaged and a torque acting on the drive side can be transferred to the output disc 5 without counteracting locking action by the coil spring brake. For this the shift claw 35 acts through the shift element 43 and a damping element 45a which is mounted between the shift element 43 of the one spring end 41 and a stop face 55a of the output disc 5, whereby the elastic damping element 45a is compressed in the circumferential direction. At the same time the further shift claw 36 of the planet carrier 30b acts through a further damping element 46a along the same direction A on a further stop face 56a of the output disc 5 whereby this damping element 46a is also compressed. This hereby triggers a rotational movement of the output disc 5 along the same rotational direction A along which the planet carrier 30b of the second gear stage moves (triggered through a rotational movement of the disc rotor 1).

This movement is continued so long as the disc rotor 1 is energized and rotates whereby the window pane of a vehicle door coupled through draw device Z in the form of a drive cable (see FIG. 3) to the cable drum 6 (see FIGS. 1, 2 and 3) of the servo drive is lifted by way of example (corresponding to a lowering of the window pane with an opposite rotational movement of the output disc 5 along a direction B).

The rotational movement of the output disc 5 (and thus the cable drum 6 on the output side) as well as the corresponding raising of the window pane being adjusted finish when the energizing of the disc rotor 1 terminates (or when the window pane has reached its upper closing position in a seal and the drive is automatically switched off). When moving up to a block (thus for example on reaching the upper closing position of a window pane) it results in a severe deformation of the active damping elements 45a, 46a in the corresponding rotational direction A through which the two shift claws 35, 36 act on the associated stop face 55a, 56a of the output disc 5 whereby the maximum torque acting on the output disc 5 or cable drum 6 is restricted in order to avoid stop noises as well as peak stresses and wear on the servo drive.

After the manual or automatic switching off of the servo drive (on reaching an end position of the adjusting part) (through breaking off the current supply to the disc rotor 1) the active damping elements 45a, 46a in the relevant rotational direction again relax whereby the one damping element 45a acts on the shift element 43 of the one end 41 of the coil spring 4 so that this is again pressed radially against the associated brake face 24 and the coil spring brake is locked again. This is due to the fact that the relaxing damping element 45a acts on the associated shift element 43 of the one spring end 41 precisely in the opposite direction to the direction A along which the shift claw 35 has previously acted on the shift element 43 of this spring end 41 in order to disengage the coil spring brake and furthermore to trigger the rotational movement along the desired rotational direction A. During relaxation of the corresponding damping element 45a there is a slight resetting movement of the output disc 5 and the cable drum 6 and thus also the adjusting part adjusted therewith (corresponding for example to a slight lowering of a window pane which had previously moved into its upper closing position). The coil spring system is structurally designed so that this resetting behaviour has no significant action on the previously reached adjusting position of the corresponding adjusting part, thus for example a window pane does not move out from the upper window pane seal in which it had previously entered. This is ensured in particular in that the relevant coil spring end 41 and 42 does not or only slightly move away from the brake face 24 when disengaged.

Furthermore it is to be ensured that through the relaxation of the damping elements 45a, 46a not too much reaction occurs on the associated shift claws 35, 36 so that the one shift claw 36 by overcoming the reverse play U of the locking mechanism only moves through the other shift element 44 the corresponding coil spring end 42 in the opposite direction, loosens the coil spring and thus could trigger a rotational movement along the opposite direction B; a residual reverse play must remain in the locking mechanism. For this it can be of assistance if the planet carrier 30b of the second gear stage interacts e.g., in the region of the undercut sections 52, through wedge or ramp type pairs of faces with a resetting movement with the output disc 5 so that the planet carrier 30b and the output disc 5 are clamped axially in each other by way of example and the resetting movement is braked. Alternatively or in addition an axial tensioning between the planet carrier 30b and the output disc 5 are reached through corresponding design of the damping elements 45a, 45b; 46a, 46b. Through the cross-sectional increase in the compressed (incompressible/ volume constants) dampers when blocked it is likewise possible to obtain an axial tensioning of the output disc 5 and planet carrier 30b. Furthermore, the electrical connections of the servo drive, thus in particular the disc rotor 1, can be short-circuited on switching off the servo drive in order to produce a temporary inertia effect on the drive side through counter induction, thus a resetting movement of the servo drive is temporarily counteracted until the damping element 46a or 45b has relaxed.

During a rotational movement of the servo drive along the opposite direction B the same processes occur as previously described with reference to the rotational movement in a first rotational direction A whereby however the shift claw 36 disengages the coil spring 4 over the other spring end 42 with an associated shift element 44 and together with the further shift claw 35 acts through damping elements 45b, 46b on oppositely aligned stop faces 55b, 56b of the drive disc 5.

This means that in dependence on the rotational direction A, B the shift claws 35, 36 act on one or other spring end 41, 42 to disengage the coil spring brake, so that the coil spring 4 is expanded and they furthermore act through damping elements 45a, 46a and 45b, 46b along the one direction A or along the other direction B on suitably orientated stop faces 55a, 56a and 55b, 56 respectively of the output disc 5 in order to move the latter along the desired rotational direction A or B after disengaging (releasing) the coil spring brake.

The locking action of the coil spring brake when torque is introduced on the output side is based on the fact that in this case, depending on the direction of the torque introduced on the output side a stop 55a or 56b acts through the associated damping element 45a or 46b on the shift element 43 or 44 of a relevant spring end 41, 42, respectively, so that the coil spring 4 is radially contracted and is pressed in the radial direction r against the brake face 24 whereby a rotational movement is blocked with force and friction locking action.

The coil spring brake is thus each time released or blocked in that either a force transfer element on the drive side (shift claws 35, 36 of the planet carrier 30b of the second gear stage) act on a spring end 41, 42 so that the coil spring 4 is released from the brake face 24 or the radial pretension is reduced, or a force transfer element on the output side (stop faces 55a, 56b of the output disc 5) acts on one of the spring ends 41, 42 so that the coil spring 4 is radially compressed and placed against the brake surface 24.

The force transfer elements on the output side thereby act on the relevant spring end 41 or 42 each time opposite the direction along which the force transfer elements on the drive side act on the corresponding spring end. Thus, on the one hand, it causes compression and, on the other, the expansion of the coil spring 4.

The function of the servo drive according to the invention was explained here in FIGS. 1 to 5c by way of example with reference to an application where the servo drive serves to generate a rotational movement of a cable drum 6 of a motor vehicle window lifter and consequently causes a raising or lowering of a window pane in a motor vehicle door. The servo drive can, however, also serve in a corresponding way to adjust any other adjustable parts, such as e.g. adjustable seat parts or other vehicle components, as well as to adjust adjustable parts apart from motor vehicle parts.

One important advantage of the servo drive described lies in its low structural height in the axial direction so that its application is preferred in such cases where there is only little structural space in the axial direction for a servo drive, such as for example in motor vehicle doors or on vehicle seats. The small axial extension of the servo drive is achieved in that the coil spring 4 serving as the brake encloses the stepping-up mechanism of the servo drive (e.g. in the form of a planetary gearing 3) around the periphery and thereby does not require any additional structural space in the axial direction. The shift elements for actuating the coil spring 4 and the force transfer elements and damping elements for transferring forces introduced on the drive side over to the output side are in turn mounted on the outer periphery of the coil spring 4 so that their arrangement also helps to minimize the structural height in the axial direction.

Overall the stepping up mechanism of the servo drive, the coil spring brake as well as the shift, force transfer and damping elements by means of which the stepping up mechanism is coupled to the output element and the coil spring brake is shifted, thereby lie in one common plane perpendicular to the drive axis 10 and thereby—viewed in the radial direction—on radially successive shells.

Differing from the illustration in FIGS. 1 to 5c it is thereby possible to arrange the brake surface assigned to the coil spring 4 also radially outside of the coil spring 4 on the inner housing part 2b on the gear side so that the coil spring 4 has to be expanded in order to achieve a braking action and has to be compressed on releasing the coil spring brake because in this case the brake surface surrounds the coil spring 4 in a ring. It is then preferred to arrange the shift, force transfer and damping elements radially inside (instead of outside, as in the illustrated embodiment). More particularly the spring ends in this case protrude radially inwards (instead of radially outwards) from the coil spring.

Modifications of the servo drive illustrated in FIGS. 1a to 3 will now be described with reference to FIGS. 6 to 8, namely in particular regarding the stepping up mechanism which serves to step up the torque generated at the disc rotor 1 to the output element 5 (and the cable drum 6).

Figure 6:
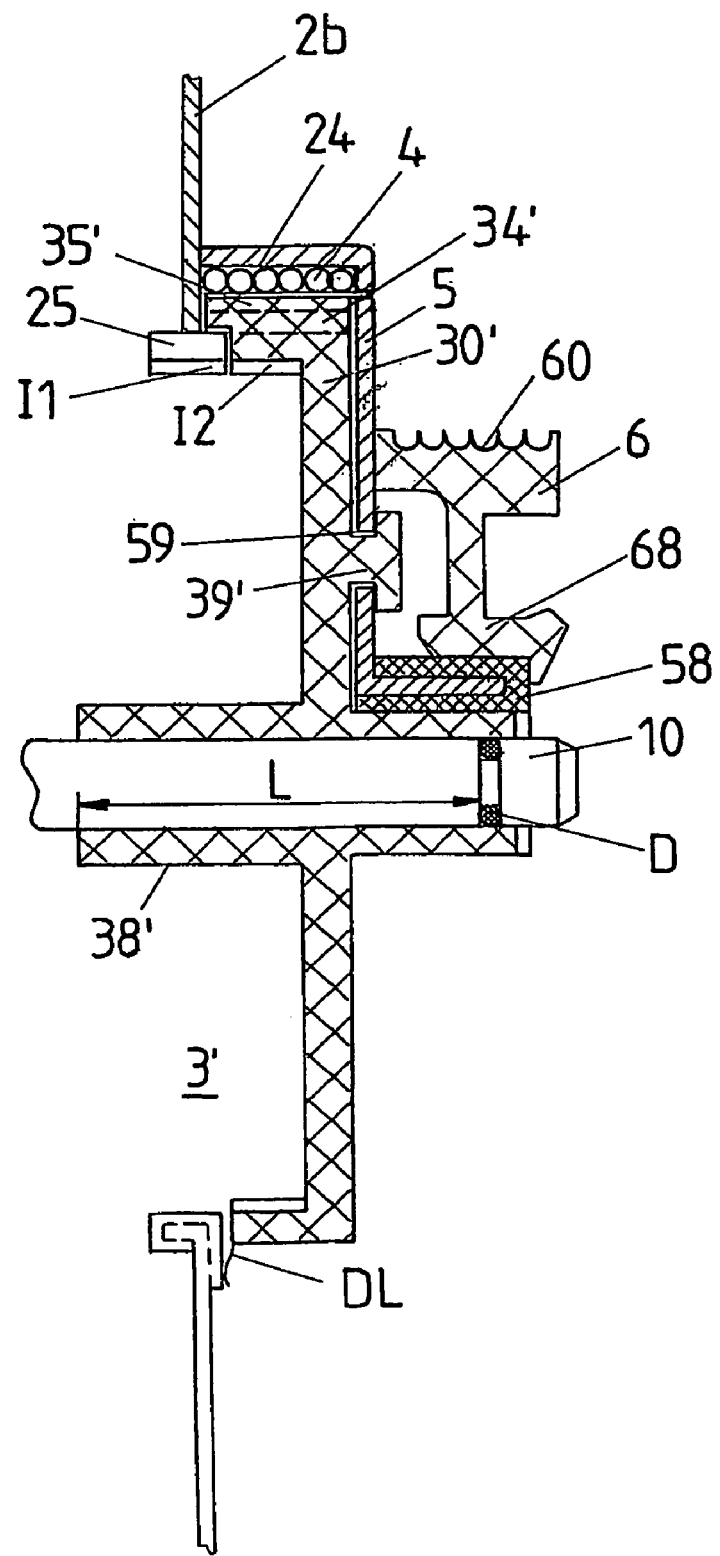
FIG. 6 illustrates a modification of the servo drive of FIGS. 1 to 3 in respect of the gear elements through which the cable drum is coupled to the electromechanical energy converter on the drive side.
Figure 7:
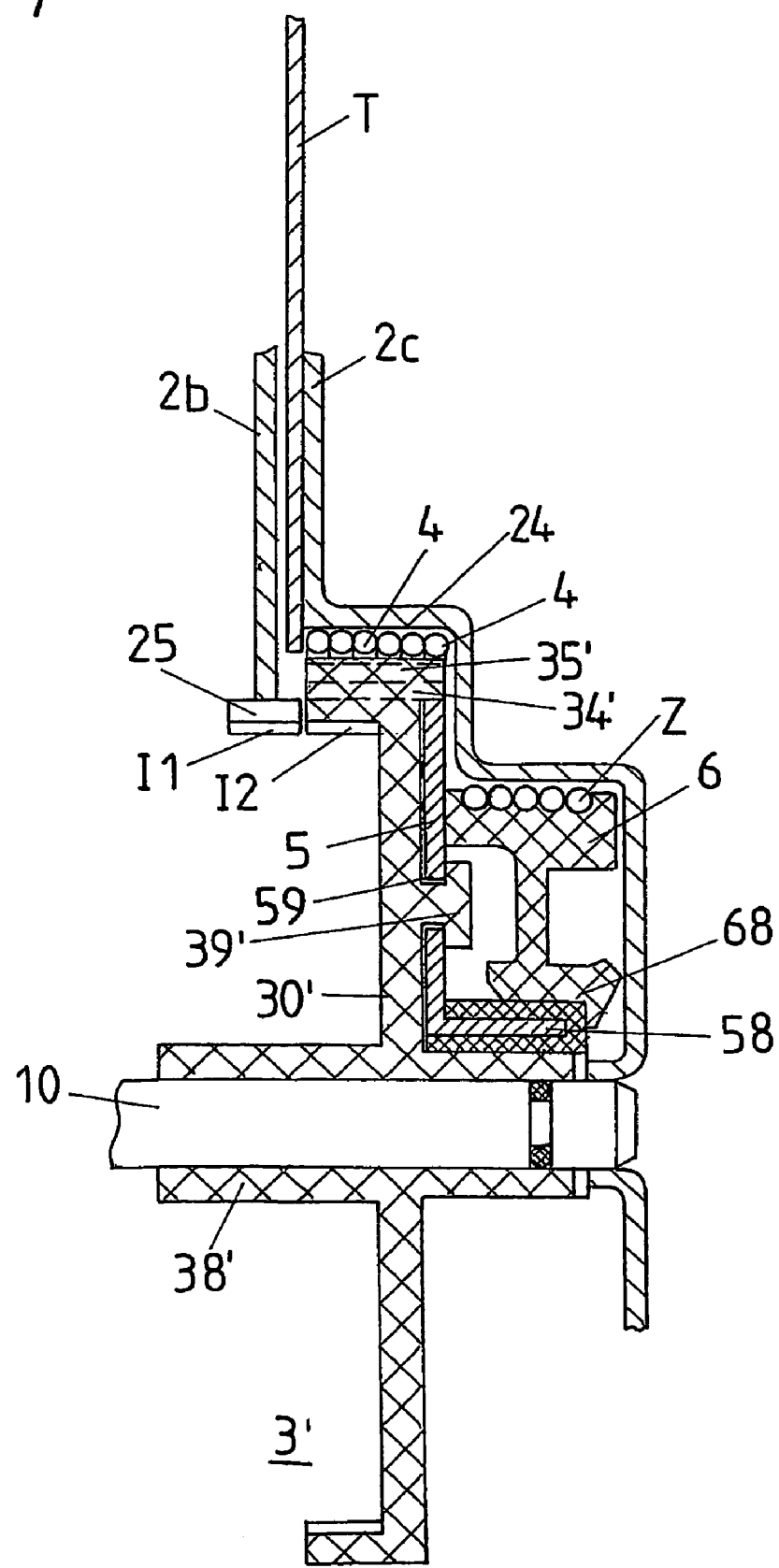
FIG. 7 is a first modification of a servo drive according to FIG. 6.
Figure 8:
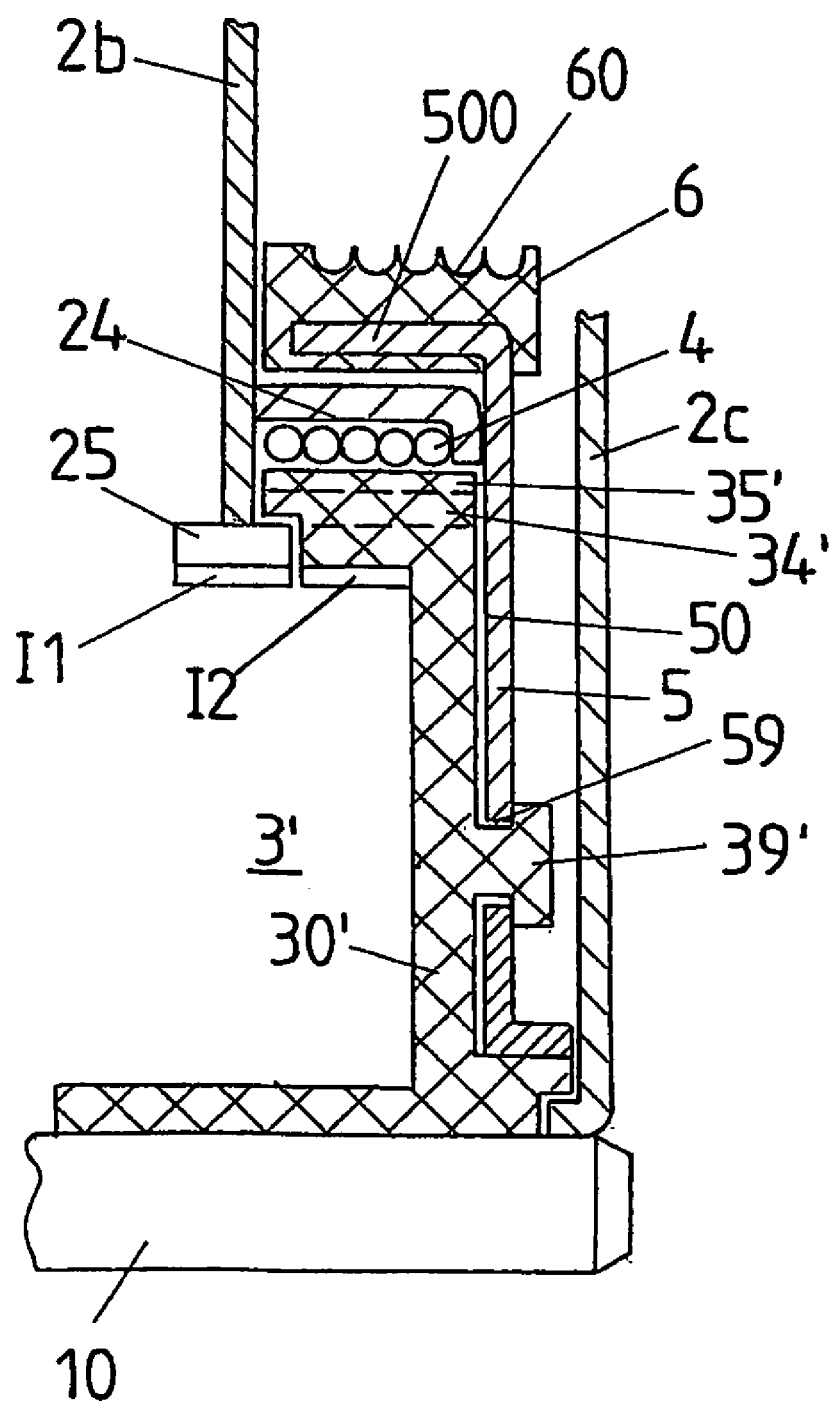
FIG. 8 is a second modification of a servo drive according to FIG. 6.

The stepping up gear which forms the basis of the embodiments according to FIGS. 6 to 8 is based for example on a so-called "harmonic drive gear" as reduction gear. A gear of this kind comprises two coaxially mounted hollow wheels which have a (slightly) different number of teeth and are in active connection with a common drive element through their relevant toothing. A stepping up is thereby reached through the different number of teeth of the two hollow wheels.

Thus in concrete form a reduction gearing of this kind comprises, by way of example, a first hollow wheel fixed on the housing and having a cylindrical internal toothing with a first number of teeth; an output hollow wheel which has a cylindrical internal toothing with a second number of teeth; a radially flexible ring with an inner sleeve face and an external toothing which engages with the internal toothing of the hollow wheel fixed on the housing and of the output hollow wheel; as well as a drive core which holds one or more peripheral sections of the external teeth of the radially flexible ring in circumferential engagement with the internal teeth of the hollow wheel fixed on the housing and of the output hollow wheel. As a result of the different number of teeth of the two internal toothings, one complete revolution of the drive core which is to be driven by means of a suitable electromechanical converter (disc rotor) causes a rotational movement of the output hollow wheel about the proposed difference in the number of teeth of the hollow wheel fixed on the housing and the output hollow wheel. Thus with one such gearing a very high transmission ratio can be reached, for example in the form of a reduction.

As far as further details of the construction of a gearing of this kind are concerned reference is made to DE 100 24 905 A1 and DE 100 24 908 A1. Comparable gearings are furthermore described in DE 199 44 915 A1 and DE 100 24 907 A1, more particularly by using a disc rotor for generating a torque on the drive side.

FIG. 6 shows the use of a stepping up mechanism (stepping up gear) of the type mentioned above for a servo drive having a coil spring brake, as shown in FIGS. 1 to 3. The stepping up gear which is based on the relative movement of two hollow wheels having different numbers of teeth replaces the stepping up mechanism formed by a planetary gearing in FIGS. 1 and 2 and can be used for example as a stepping up gear 3 in the servo drive of FIG. 3.

According to FIG. 6 a first hollow wheel 25 fixed on the housing is fixed with a first internal toothing I1 on the inner housing part 2b on the gear side of the servo drive and an output hollow wheel 30' which is mounted coaxial with this on the fixed drive axis 10 is mounted axially on the pot-shaped output disc 5 of the servo drive in the manner of a bayonet lock through a positive locking connection by means of detent elements 39',59. The internal toothings I1, I2 of the hollow wheel 25 fixed on the housing on the one hand and of the output hollow wheel 30' mounted coaxial with same rotatable on the drive axis 10 on the other hand have a slightly different number of teeth. In that a drive element with an external toothing, e.g., a radially flexible ring, which is driven by the disc rotor (not shown in FIG. 6) mounted on the drive axis 10 engages by its external teeth with the two internal toothings I1, I2 of the hollow wheels 25, 30', the rotational movement of the disc rotor is reduced. For each revolution of the disc rotor or of the drive element driven hereby and engaging with the internal toothings I1, I2 of the hollow wheels 25, 30' causes a rotational movement of the output hollow wheel 30' corresponding to the difference in the number of teeth of the two internal toothings I1, I2. For further details regarding the generation of a rotational movement of a drive element suitable for this by means of a disc rotor and regarding the design of the drive element, more particularly as a radially flexible ring with an external toothing and an associated drive core, reference is made by way of example to the documents already mentioned DE 199 44 915 A1 (U.S. Pat. No. 6,629,905), DE 100 24 905 A1, DE 100 24 907 A1 and DE 100 24 908 A1.

The hollow wheel 25 fixed on the housing and having the first internal toothing 11 is thereby preferably injection moulded on the inner housing part 2b (more particularly a stamped sheet metal part). The hollow wheel 30' preferably concerns an injection moulded plastics part which is provided with detent elements 39' which can engage in the manner of a bayonet lock in associated detent openings 59 of the output disc 5 (more particularly a stamped sheet metal part) in order to cause an axial bearing and guide for the output disc 5 through the output hollow wheel 30' which is mounted through an axially elongated central bearing reign 38' with great support length L on the drive axis 10.

The pot-shaped output disc 5 has an axially extended positive locking element 58 which is coated with a plastic coating and on one side on its radially inner side serves to radially support the output disc 5 on the bearing section 38' of the output hollow wheel 30' and on the other side with its outer side serves to positively fix a cable drum 6 which has for this purpose an associated positive locking region 68. The two positive locking regions 58, 68 of the output disc 5 and cable drum 6 can thereby be fixed against one another more particularly through toothed elements, e.g. in that the positive locking element 58 of the output disc 5 is formed on its outer side as a multi-toothed cone. The bearing cover 2c which receives the cable drum 6 (see FIGS. 1a and 1b) is for clarity not shown in FIG. 6.

The output hollow wheel 30' and the output disc 5 are rotatable restricted relative to each other as described in FIGS. 1 to 3 for the planet carrier 30b of the second gear stage and the output disc 5. Through the output hollow wheel 30' the drive torque generated on the disc rotor is transferred to the output disc 5 by means of suitable shift claws 35' which also serve at the same time to actuate (shift) the coil spring 4 whereby furthermore locator regions 34' are provided for suitable damping elements. The output hollow wheel 30' undertakes as regards the interaction with the pot-shaped output disc 5 the function of the planet carrier 30b of the second gear stage of the planetary gearing 3 of FIGS. 1 to 3. Regarding the interaction of the output hollow wheel 30' with the pot shaped output disc 5 (both with the introduction of torque on the drive side and with the introduction of torque on the output side) reference is therefore made to the corresponding details on the interaction of the planet carrier 30b of the second planetary stage with the output disc 5, as described with reference to FIGS. 1 to 5c. This applies in particular also for the inclusion of the damping elements, coil spring brake as well as the shift elements provided at the spring ends of the corresponding coil spring.

A further difference from the arrangement described with reference to FIGS. 1 to 5c lies in the fact that the coil spring 4 which in turn is mounted on the outer circumference of the stepping up mechanism 3', namely on the outer circumference of the two hollow wheels 25, 30' is surrounded by the associated ring-like (hollow cylindrical) brake surface 24. The brake surface 24 is formed on a brake pot of the inner housing part 2b on the gear side, by way of example in the form of a sheet metal ring set on the housing part 2b. Consequently here the coil spring 4 is pretensioned radially outwards and with the introduction of torque on the output side is pressed radially outwards against the associated brake surface 24 in order to generate the desired locking action. With the introduction of torque on the drive side (starting from the corresponding disc rotor) over the output hollow wheel 30' however the coil spring 4 is actuated at its ends by means of the shift claws 35' of the output hollow wheel 30' at their spring ends so that it is lifted radially inwards from the brake surface 24.

In order to seal the servo drive (e.g. when it is used in a wet space) a ring-shaped circumferential sealing lip DL is provided on the output hollow wheel 30' which bears against the inner housing part 2b and grinds same while a sealing ring D is provided between the drive axis 10 and output hollow wheel 30'.

FIG. 7 shows a modification of the servo drive of FIG. 6 where the essential difference is that the brake pot with the brake surface 24 for the coil spring 4 is not formed on the inner housing part 2b on the gear side, but on the bearing cover 2c for the cable drum 6. Also here the brake surface 24 engages round the coil spring 4 so that the coil spring 4 is to be expanded radially outwards in order to generate a brake action.

It can furthermore be seen that the bearing cover 6 radially supports the drive axis 10 and is fixed together with the inner housing part 2b on a flat surface support element T, e.g., in the form of a support plate of a motor vehicle door. The support element T is thereby housed between the inner housing part 2b and a fixing flange of the bearing cover 2c and serves at the same time to axially secure the coil spring 4 in an axial direction so that the coil spring 4 is fixed axially between a section of the support element T and a section of the brake pot formed on the bearing cover 2c.

FIG. 7 shows furthermore a cable wound around the outer periphery of the cable drum 6 which serves as a draw means Z for a motor vehicle window lifter and which is actuated by rotating the cable drum in one or other rotational direction to raise or lower a window pane.

FIG. 8 shows a further modification of the servo drive of FIG. 6 in which the difference is that the cable drum 6 is not mounted (by means of a positive locking element protruding axially from the output disc 5) axially behind the output disc 5 but is rather injection moulded on the outer periphery of the output disc 5 (through injection moulding), thus lies radially next to same, namely on a ring-shaped circumferential section 500 protruding away from the base surface 50 of the output disc 5. This allows the servo drive to be constructed in a particularly flat manner in the axial direction.

The servo drives illustrated in FIGS. 6 to 8 differ from those in FIGS. 1a to 3 namely in the design of the relevant stepping up mechanisms 3 and 3' which serve to step up the torque generated at the disc rotor to the output disc 5; however all the embodiments have in common that the coil spring 4 of the coil spring brake is mounted each time on the outer periphery of the stepping up mechanism 3 and 3' and engages round the rotatable gear elements of the relevant stepping up mechanism 3, 3' which serve for stepping up.

The invention claimed is:

1. A servo drive for motor vehicles, comprising:
   an electromechanical energy converter which has a rotatably mounted disc rotor for generating a torque;
   a stepping up mechanism on an output side of the disc rotor for coupling the disc rotor to an output element; and
   a locking mechanism which locks a movement of the output element under the action of a torque introduced on the output side into the servo drive, wherein the stepping up mechanism and the disc rotor are mounted coaxial relative to each other along an axis and the locking mechanism has a coil spring which extends on an outer circumference of at least one of the stepping up mechanism and the disc rotor.

2. The servo drive according to claim 1, wherein the stepping up mechanism has movable gear elements and at least a part of gear elements is mounted coaxial with the disc rotor.

3. The servo drive according to claim 1, wherein the coil spring engages around at least one of the stepping up mechanism and the disc rotor in a plane perpendicular to the axis of the disc rotor.

4. The servo drive according to claim 2, wherein the movable gear elements of the stepping up mechanism serving for stepping up do not radially project over the coil spring.

5. The servo drive according to claim 1, wherein the coil spring is provided for blocking torque introduced on the output side and is pressed radially against a ring-type brake surface.

6. The servo drive according to claim 5, wherein the ring type brake surface is one of mounted and formed on a housing part for the servo drive.

7. The servo drive according to claim 1, wherein the coil spring is mounted to act between a gear element on the output side of the stepping up mechanism and the output element whereby component parts connected to the gear element on one of the output side and to the output element by acting on the coil spring selectively one of widen out and compress the coil spring.

8. The servo drive according to claim 1, wherein the output element is pot-shaped and surrounds the coil spring.

9. The servo drive according to claim 1, wherein the coil spring has two spring ends for its actuation.

10. The servo drive according to claim 9, wherein the spring ends are each provided with a shift element which is assigned a radial guide with which the shift element is guided during actuation of the coil spring and the spring ends are inserted in radially directed socket openings of its respective shift element.

11. The servo drive according to claim 1, wherein the coil spring is pretensioned in the direction of a blocked state.

12. The servo drive according to claim 1, wherein the stepping up mechanism, with the introduction of torque on a drive side acts on the coil spring and actuates the coil spring so that it does not block transfer of torque to the output side.

13. The servo drive according to claim 1, wherein the stepping up mechanism, with the introduction of torque on the drive side, acts through at least one spring end of the coil spring on the output element.

14. The servo drive according to claim 1, wherein the stepping up mechanism, with the introduction of torque on the drive side, acts through at least one damping element on the output element.

15. The servo drive according to claim 13, wherein between the spring ends of the coil spring and the output element are damping elements.

16. The servo drive according to claim 14, wherein at least one damping element is deformed when the stepping up mechanism acts on the output element.

17. The servo drive according to claim 16, wherein after relaxation of the at least one deformed damping element a residual reverse play of the locking mechanism exists until the coil spring is locked.

18. The servo drive according to claim 1, wherein through at least one of axial and radial friction interaction of the stepping up mechanism with the output element, a damping effect is achieved when the output element becomes blocked.

19. The servo drive according to claim 18, wherein a gear element of the stepping up mechanism interacts wedge-like with the output element.

20. The servo drive according to claim 14, wherein a gear element of the stepping up mechanism and the output element are tensioned axially against each other through the damping elements.

21. The servo drive according to claim 1, wherein a gear element on the output side of the stepping up mechanism and the output element are mounted axially against one another.

22. The servo drive according to claim 21, wherein the axial mounting is through engagement in an undercut section.

23. The servo drive according to claim 21, wherein the gear element on the output side and the output element are fixed axially relative to each other with a bayonet lock.

24. The servo drive according to claim 1, wherein the stepping up mechanism comprises a revolving wheel gear.

25. The servo drive according to claim 1, wherein the stepping up mechanism comprises one of a planetary gearing and a stepping up gear with two coaxial relatively rotatable hollow wheels with internal toothings with different number of teeth.

26. The servo drive according to claim 1, wherein on the axis of the disc rotor is an axially fixed axial securing element mounted between the disc rotor and the output element so that axially acting forces introduced on the output side are taken up by the securing element and do not act on the disc rotor.

27. The servo drive according to claim 1, wherein when switching off the servo drive the electromechanical energy converter is short circuited while the coil spring is moved into a state in which it adjoins with locking action on a brake face of the servo drive.

28. The servo drive according to claim 1, wherein the servo drive has a multi-part housing whose housing parts have a reference point system for their mutual alignment.

29. The servo drive according to claim 1, wherein the axis of the disc rotor is supported radially on the output side through a housing part.

30. The servo drive according to claim 1, wherein the disc rotor has a number of electrically conductive windings which are energized and which are associated with magnets mounted locally fixed for generating torque, and wherein the magnets are adapted, at least in sections in their outer contour, to a path of a winding in a plane of the disc rotor.

31. The servo drive according to claim 30, wherein a section of a magnet adapted in its contour to the path of the winding has a circular arc.

32. The servo drive according to claim 31, wherein the outer contour of the magnets is formed by two circular arc sections whereby one circular arc section is adapted to the path of a winding of the disc rotor which has current flowing through in the same direction, and the other section restricts the magnets radially inwards in relation to the axis of the disc rotor.

33. The servo drive according to claim 32, wherein the one circular arc section of the relevant magnet has a smaller radius than the other circular arc section.

34. The servo drive of claim 7, wherein spring ends of the coil spring selectively widen out and compress the coil spring.

35. The servo drive of claim 9, wherein the two spring ends are angled.

36. The servo drive of claim 10, wherein the shift elements are further assigned an axial guide.

37. The servo drive of claim 29, wherein the housing part comprises a bearing cover.

* * * * *